No. 728,046. Patented May 12, 1903.

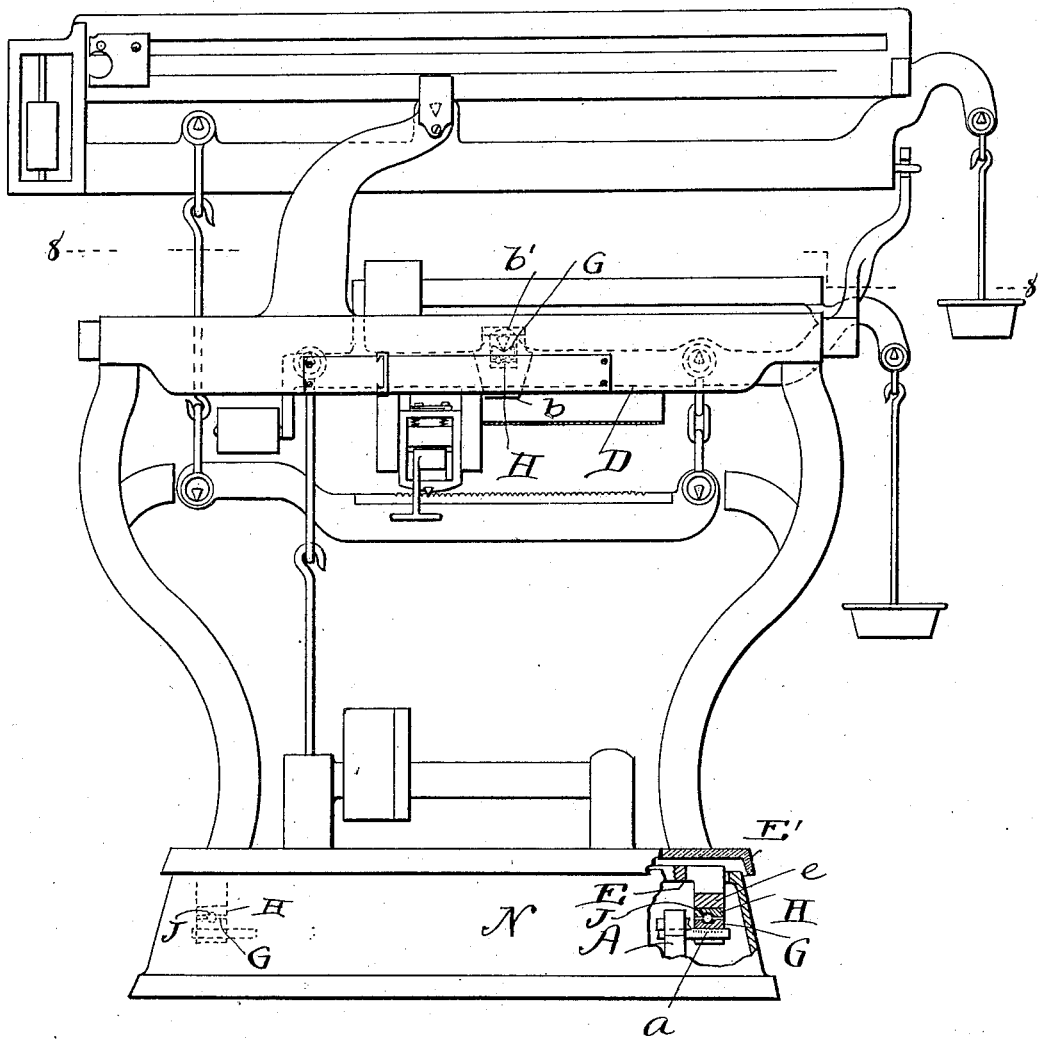

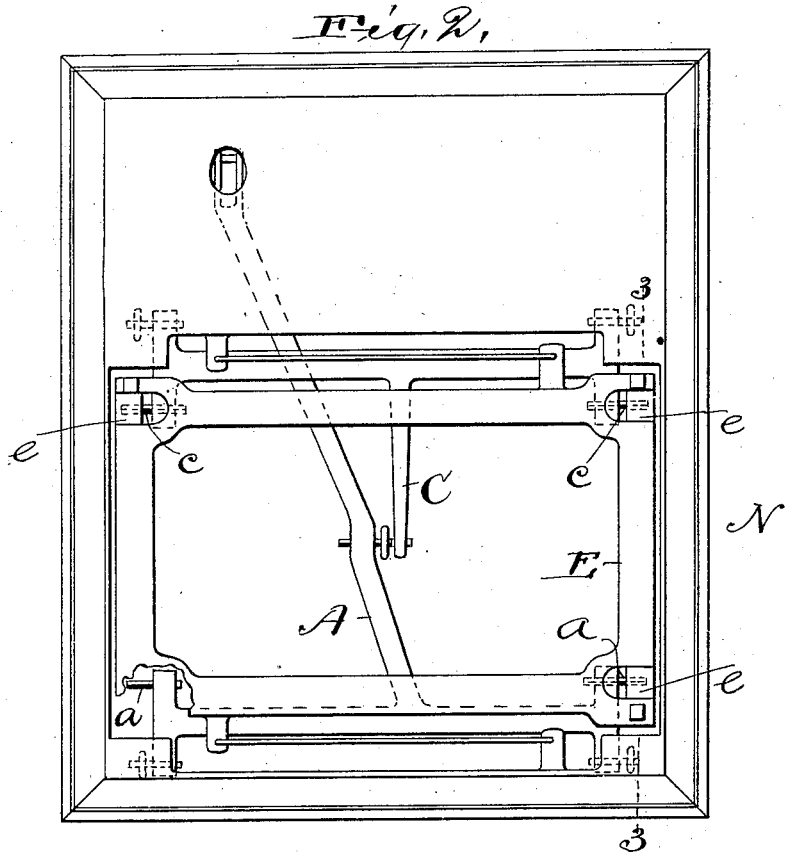
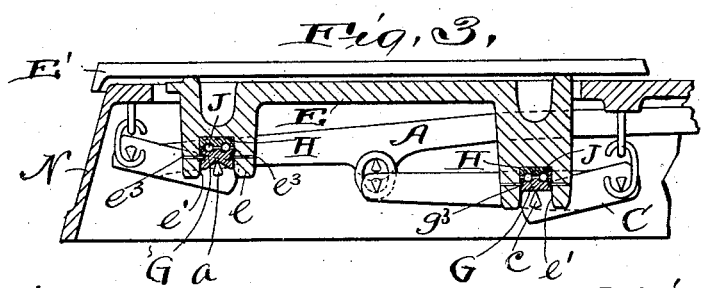
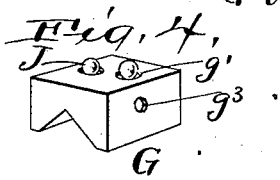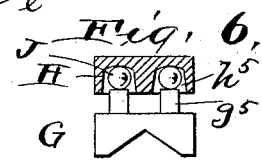
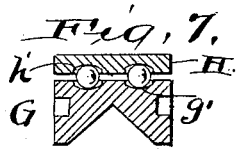

UNITED STATES PATENT OFFICE.

JOHN HENRY SWIHART AND FRANK C. HOYT, OF CLEVELAND, OHIO, ASSIGNORS TO THE NATIONAL COMPUTING SCALE COMPANY, OF CLEVELAND, OHIO, A CORPORATION OF OHIO.

WEIGHING-SCALE.

SPECIFICATION forming part of Letters Patent No. 728,046, dated May 12, 1903.

Application filed January 28, 1898. Serial No. 668,260. (No model.)

*To all whom it may concern:*

Be it known that we, JOHN HENRY SWIHART and FRANK C. HOYT, citizens of the United States, residing at Cleveland, in the county of Cuyahoga and State of Ohio, have invented a certain new and useful Improvement in Weighing-Scales, of which the following is a full, clear, and exact description, reference being had to the accompanying drawings.

The invention relates to improvements in weighing-scales, the object being to effect and maintain the proper and accurate engagement of certain knife-edge bearings with the coöperating bearing-blocks.

In scales as commonly constructed the platform or subplatform is supported at the four corners on knife-edge bearings, which are arranged in pairs as nearly in alinement as practicable. These knife-edge bearings engage with hardened bearing-blocks carried by the platform, and usually one pair of said bearing-blocks have V-shaped notches which embrace one pair of knife-edges, whereby the movement of the platform transverse to said knife-edges is prevented. Moreover, the scale-beams commonly carry two alined knife-edge bearings which are supported in V-shaped notches in coöperating hardened bearing-blocks, which are supported on a fixed scale member—that is to say, to a part of the framework. In an accurate and sensitive scale each of these knife-edges and the coöperating V-shaped notches in the associated bearing-block must be in perfect alinement relative to each other, and the knife-edge bearings and the blocks must engage squarely with each other to prevent binding and to diminish friction—a result very difficult to attain unless the bearing-blocks are adjustable. We are aware that various expedients have been adopted for independently adjusting the bearing-blocks to cause the proper engagement of the knife-edges with them and that in certain prior constructions the bearing-blocks have been self-adjusting to the extent to which they have been adjustable at all. By the combination of parts constituting our invention as claimed the bearing-blocks have a wider range and a more nearly universal automatic adjustment than in prior constructions, and these adjustments are effected with very little friction. The construction is not expensive and is extremely durable. The parts are always held in operative position to effect the desired result, and this result is effected with absolute accuracy.

In the drawings, Figure 1 is a front elevation of a computing-scale embodying our invention. Fig. 2 is a plan view of the subbase and platform-levers. Fig. 3 is a vertical sectional view in the plane indicated by line 3 3. Figs. 4 and 5 are respectively a perspective view of one of the bearing-blocks G and a perspective view of one of the plates H. Fig. 6 is a sectional view of a substitute construction. Fig. 7 is an enlarged sectional view of one bearing-block G, associated plate H, and interposed balls.

The scale shown is a computing-scale which, except in the particulars hereinafter pointed out, is substantially like the computing-scale shown and described in Letters Patent No. 578,784, granted to J. H. Swihart March 16, 1897. This scale is shown simply to illustrate the invention, but without any intention to limit the invention to this particular scale or to any computing-scale.

Referring to the parts by letters, N represents a hollow scale-base which incloses and supports the platform-levers A and C, which may be of any approved form. The lever A carries two horizontal knife-edge bearings $a\,a$, which are arranged as nearly as may be in the same horizontal plane and in alinement, near the front of the scale. The lever C carries two similarly-arranged knife-edge bearings $c\,c$, near the rear of the scale. In some scales the platform itself is supported on these four knife-edges. In others the platform rests upon a subplatform which is supported upon the knife-edges. The latter construction is shown in the drawings; but the invention is equally applicable to either construction. In fact, it may be assumed for the purpose of this description that the platform E' is rigidly fastened to the subplatform E, and we will during the remainder of this description ignore the fact that they are separable pieces, and we shall therefore for convenience use the term "platform" to indicate that member which carries the bearing-blocks which rest upon the knife-edges. At each of the four corners of the platform is a downwardly-extended leg $e$, and each leg is bifurcated, the furcation $e'$ extending in the same direction as the knife-edge bearings $a\ a\ c\ c$. The bifurcated leg forms an efficient housing for the self-adjusting bearing-blocks. In the end of each furcation or housing are two depressions $h'$, the bottoms of which rest upon steel balls, whereby the platform is supported. The bottoms of these depressions should be very hard, whereby they would be adapted to resist the wear. These hardened surfaces are preferably secured by forming the depressions in hard-steel plates H, which are secured to the platform at the end of the furcation, whereby these plates form the horizontal ends of the housing. G represents a bearing-block, one of which is placed loosely in each of said housings. It is free to move to the extent hereinafter indicated in various directions—that is to say, it is able to move slightly in all directions in a substantially horizontal plane—and its ends are also movable up and down about the fulcrum furnished by the balls J. In the proximate surfaces of each plate H (which, as before stated, forms the end of the furcation or horizontal end of the housing) and bearing-block G are formed depressions $h'$ and $g'$, the bottoms of which are preferably slightly concave. As shown in Fig. 5, two depressions are formed in each plate and block, and the depressions are arranged substantially as shown, whereby a vertical plane passing through the center of both depressions will extend transverse to the housing and will be at right angles, substantially, to the knife-edges. By the term "transverse to the housing" is meant across the furcation in contradistinction to lengthwise thereof, or from one open side to the other. Between each plate H and block G and in those depressions are placed two hard-metal (preferably steel) balls J J, which necessarily form a single row transverse to the housing. The depressions are of such size that the balls may move in them to a limited extent—that is to say, until the balls engage with the sides of said depressions—wherefore it is evident that the bearing-blocks G may move more or less, relative to the plates H, not only substantially horizontally in all directions, but also as upon a horizontal axis coincident with the line of contact between the balls and the block G. In the outer (lower) surface of the two front blocks G are the V-shaped grooves, which are intended to bear evenly, at the apex of the groove, upon the knife-edges $a\ a$. The movements of the blocks G upon the balls, as described, allow them to automatically fit themselves upon said knife-edges, and that, obviously, with practically no friction. The lower faces of the rear bearing-blocks G may have plane horizontal surfaces, wherefore the described horizontal movement of the blocks is unnecessary; but they will rock upon the balls, as previously described, and thereby automatically come into position resting squarely on the knife-edge bearings $c\ c$.

It is believed that the particular construction of the bearing-blocks G and plates H shown in Figs. 4 and 5 and heretofore described is for many reasons the best; but the construction shown in Fig. 6 is both operative and embodies the invention. In the construction shown in Fig. 6 the block is provided with two studs $g^5\ g^5$, said studs being arranged transversely with respect to the V-shaped groove. The plate H has two very deep depressions $h^5$. The balls rest upon the studs, and not only the balls, but the studs also, enter the depressions so far that the ends of the studs will, when the blocks move, engage with the sides of the depressions, thus limiting the relative movement of block and plate, and as a consequence limiting the relative movement of the balls relative to either. In a practical construction these blocks must be prevented from moving so far away from the plates H as to permit the balls to escape from said depressions, when the part which carries the blocks (the platform, as shown) is lifted off the platform-levers. To secure this result, we provide two pins $e^3\ e^3$, which are secured in the sides of the housing and loosely enter holes $g^3$ in the sides of the block. These pins are not pivots nor do they support any of the weight of the parts when said parts are assembled as described. Their only function is to prevent the blocks G from moving out of operative relation with the balls and plates H. Any other means for this result might be substituted, provided such means did not interfere with the described free movements of the bearing-blocks.

The invention, considered broadly, is not limited in its use to the scale-platform, but may be used at any other point in a scale when such use will be advantageous. For example, the bearings for the scale-beams may be similarly constructed.

The two fixed brackets $b\ b$, which support the bearing-blocks, are bifurcated, thereby forming a housing like those formed by bifurcating the legs of the platform, and a plate H' is rigidly secured in a horizontal position to the bottom of said furcation. One of the bearing-blocks G' is loosely fitted in each housing above and parallel with plate H'. In the upper surface of said blocks the V-shaped grooves are formed, and the alined knife-edge bearings $d$, which are secured to and project horizontally on each side of the beam D, rest upon said bearing-block in said grooves. In the bottom of said block and in the top of the plate H' two depressions $g'\ h'$ are formed, and two balls J' J' lie in said depressions and between the block and plate. The depressions are so placed that a vertical plane passing through the center of both balls is at substantially right angles to the knife-edge bearings $d$. A plate $b'$ is secured to the top of the housing, and it lies so close to the knife-edge bearing $d$ (but out of contact therewith) that only a very limited upward movement of said bearing is permitted, this movement being so small that the bearing-block cannot move away from plate H' far enough to permit the balls to escape from said depressions. The blocks G' have the same freedom of motion as the blocks G, and they automatically adjust themselves to properly engage with the knife-edge bearing $d$.

Having described our invention, we claim—

1. In a scale, in combination, a scale member having a housing which includes two substantially vertical sides and a horizontal end, a bearing-block so loosely placed in said housing that it is capable of a limited horizontal movement therein in all directions and having holes in its sides, a row of balls placed between the block and end of the housing and means for holding said balls in a row transverse to the housing, two pins secured to the sides of the housing and entering and fitting loosely into the holes in said block, whereby said pins do not act as pivotal supports for the blocks, but serve merely to retain the block in the housing and prevent its movement far enough away from the end of said housing to permit the escape or displacement of the balls, substantially as specified.

2. In a scale, in combination, a bifurcated support for a bearing-block, a horizontal hard plate fastened in the end of the furcation, a bearing-block so loosely placed in the furcation that it is capable of a limited horizontal movement therein in all directions and having holes in its sides, pins projecting from the forks into said holes and fitting loosely therein, the plate and block having in their proximate faces depressions which are in the same vertical plane with the said pins, hard balls confined in said depressions, substantially as specified.

In testimony whereof we affix our signatures in the presence of two witnesses.

JOHN HENRY SWIHART.
FRANK C. HOYT.

Witnesses:
OLIVE GILL,
PHILIP E. KNOWLTON.